G. W. SOUTHWICK.
MOLDING MACHINE.
APPLICATION FILED APR. 17, 1908.
1,000,205.
Patented Aug. 8, 1911.
2 SHEETS—SHEET 2.
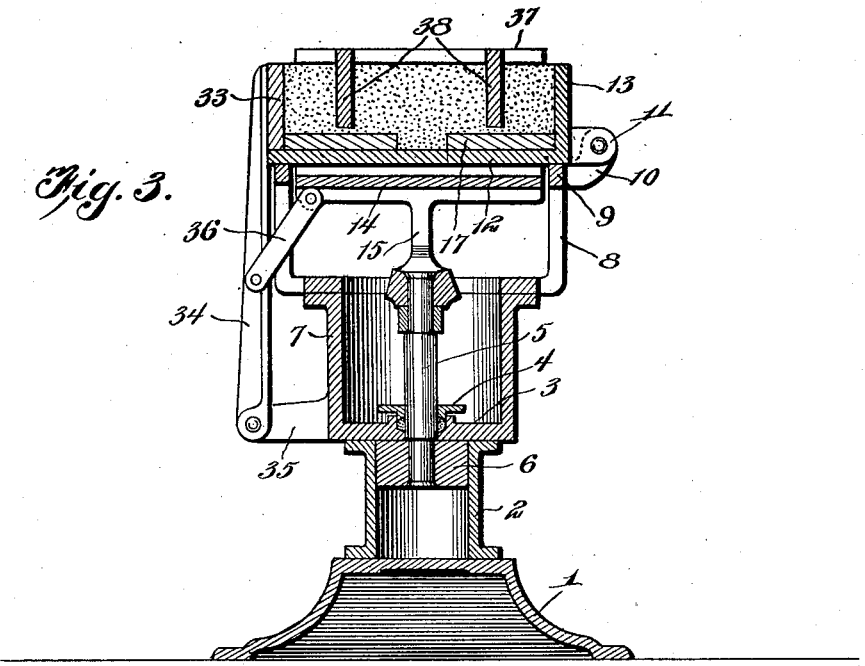
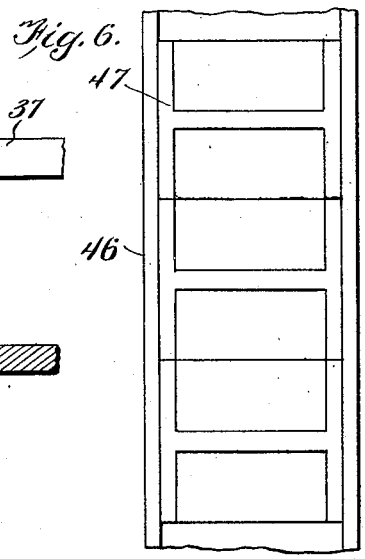
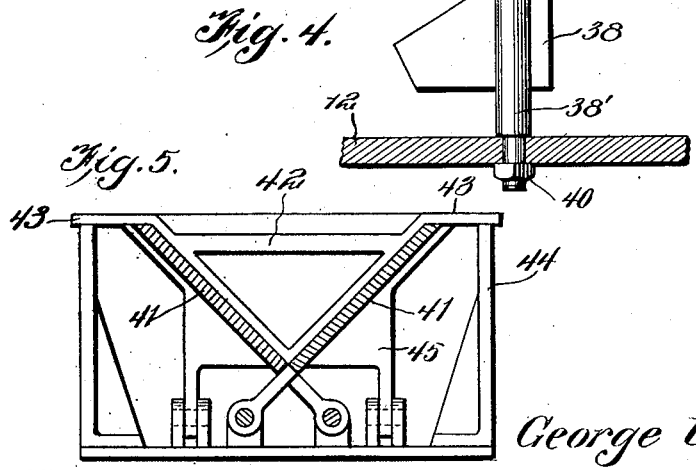
Witnesses
Louis R. Heinrichs
Inventor
George W. Southwick
By Victor J. Evans
Attorney

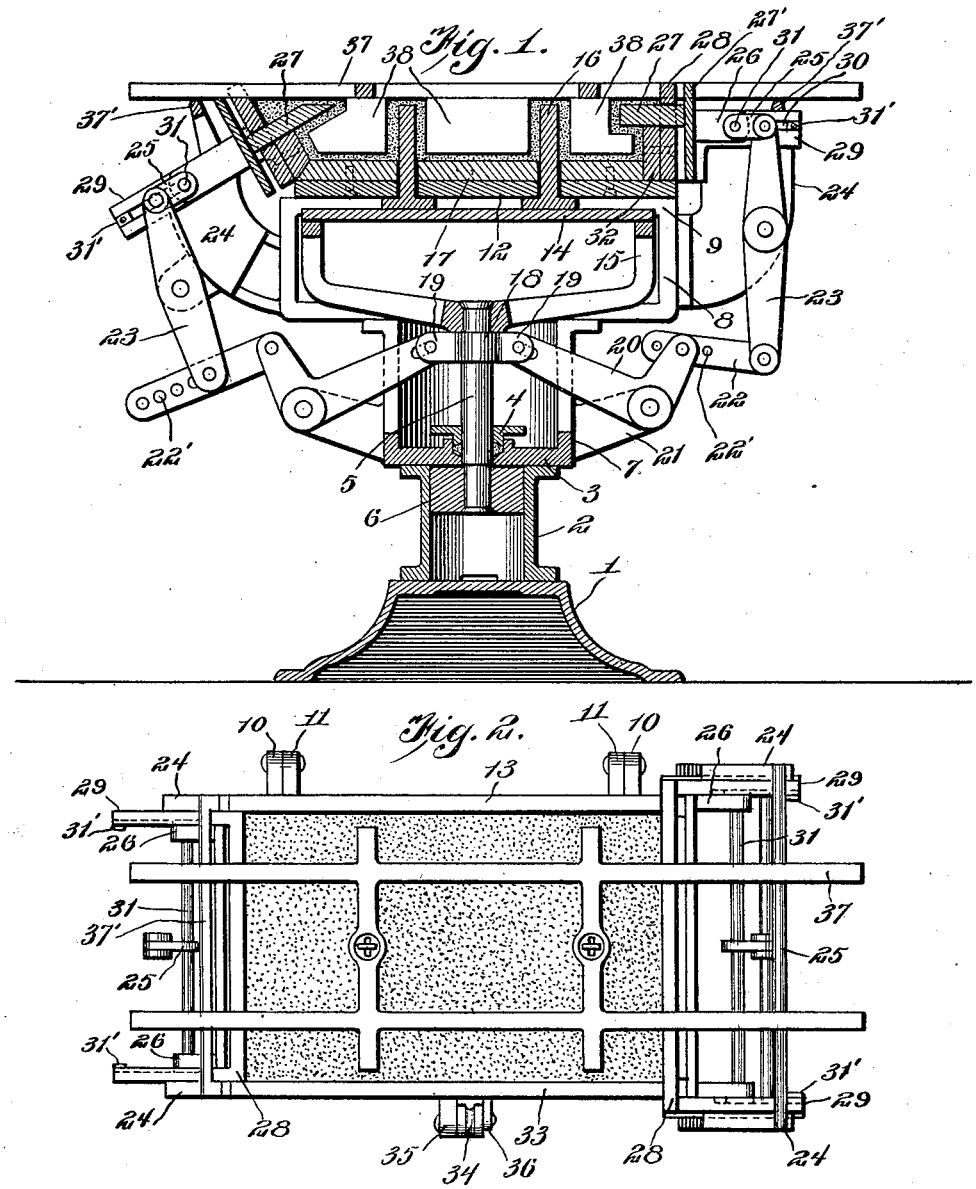

UNITED STATES PATENT OFFICE.

GEORGE WILLIAM SOUTHWICK, OF QUINCY, ILLINOIS.

MOLDING-MACHINE.

1,000,205.  Specification of Letters Patent.  Patented Aug. 8, 1911.

Application filed April 17, 1908. Serial No. 427,715.

*To all whom it may concern:*

Be it known that I, GEORGE WILLIAM SOUTHWICK, a citizen of the United States, residing at Quincy, in the county of Adams and State of Illinois, have invented new and useful Improvements in Molding-Machines, of which the following is a specification:

This invention relates to machines or devices for making molds for castings, and one of the objects of the invention is to produce a machine of this character whereby molds will be produced from the green sand without the use of cores, one in which an arbor is employed provided with a plurality of keys whereby the mold is effectively supported.

Another object of the invention is to produce a machine of this character, the parts of which are so constructed and arranged that the patterns may be withdrawn simultaneously from the sand in different directions, and the mold supported by a removable arbor, which may be readily removed from the flask.

Another object of the invention is to provide a molding machine, the parts of which are so arranged that when the hinged mold forming walls are operated, the mold thus formed presents substantially one half of two complete molds, being the ends of both molds and one half of the body of each mold, so that the mold thus formed may be positioned in a suitable trough and the next mold formed placed beside the first mold or unit to form a complete mold and one half of a mold which is to be completed by the next unit formed.

Another object of the invention is to provide a machine of this character with a plurality of pattern plates having pattern ribs movable in the mold walls, the plates being provided with means whereby they may be partially withdrawn from the mold walls and when moved a predetermined distance to also slide the mold walls away from the mold.

Another object of the invention is to provide a machine of this character with means for adjusting the mold walls and pattern ribs to permit the ribs and wall to assume any desired angle in relation to the mold to be formed by the ribs and walls.

A still further object of the invention is to provide a molding machine with an arbor having mold retaining keys and provided with novel locking means for retaining the mold, the machine being provided with means for supporting the arbor after the mold walls have been moved away from the mold.

A still further object of the invention is to provide a molding machine with a hinged side whereby the mold may be readily rolled over upon a suitable receiving table, the arbor to which the mold is secured being provided with novel locking means for securing the mold upon the bottom mold board when the mold is rolled over, said means being so constructed as to allow the mold board and arbor to be readily detached to allow the parts of the molding device to be swung back into position upon the machine.

With these and other objects in view the invention resides in the novel construction of elements and their arrangement in operative combination, hereinafter fully described and claimed.

In the accompanying drawings, Figure 1 is a vertical longitudinal sectional view of the device. Fig. 2 is a top plan view of the same. Fig. 3 is a central transverse sectional view. Fig. 4 is a detail sectional view illustrating the manner of securing the pattern plate or bottom mold board to the arbor. Fig. 5 illustrates a slightly modified form of the device. Fig. 6 is a plan view of a trough adapted for the reception of the mold units formed by the machine.

In the accompanying drawings, and referring particularly to Figs. 1 to 4 inclusive, the numeral 1 designates the base of the machine. Mounted upon this base 1 is a fluid chamber 2, having an upper wall 3 provided with a suitable stuffing box 4 adapted for the reception of a plunger rod 5 secured upon a piston 6 adapted for reciprocation within the fluid chamber 2. The piston rod 5, as illustrated in Figs. 1 and 3 of the drawings, is inclosed within a suitable casing 7. Mounted upon this casing 7 are arms 8 supporting a rectangular frame 9. The rear arm of the frame 9 is provided with suitable ears 10 adapted for engagement with similar ears 11 provided upon the rear wall 13 of the flask. The flask or mold wall 13 may be integrally connected with the bottom mold wall 12 as illustrated in Fig. 3 of the drawings, but it is to be understood that these walls may be formed separately if desired, and the side and front walls are arranged as separate members, as will be apparent as the description progresses.

Arranged within the rectangular frame 9 is a drop plate or table 14, having a suitable yoke 15, by which it is connected with the plunger rod 5. Secured upon this table 14 are pattern ribs 16, projecting in a vertical direction from the table. The bottom plate 12 of the flask is provided with suitable cut away portions adapted for the reception of the pattern ribs. The numeral 17 designates the bottom mold or pattern plate. This plate 17 is fixed upon the plate 12, and is provided with cut away portions coinciding with those of the plate 12, with which they aline, and which are also adapted for the reception of the pattern ribs 16 of the drop table 14. The plunger rod 5 is provided with a suitable collar 18, having projecting lugs 19 adapted for the reception of one arm of L-shaped levers 20. These levers 20 extend in diametrically opposite directions toward the ends of the machine and are pivoted in lugs 21 secured upon the members 7 of the frame. The free ends of the L-shaped levers are pivotally connected with the links 22 secured upon arms 23 pivotally mounted in brackets 24 provided by the upright arms of the frame 9. The links 22 are provided with a series of openings 22' by which the swing of the arms may be regulated and the mold walls and pattern plates, hereinafter to be described, may be adjusted to any desired angle in relation to the mold. The upper extremities of arms 23 are pivotally connected with a link 25 secured upon an ear 26 provided upon the pattern plates 27'. The pattern plates 27' are provided with longitudinally extending pattern ribs 27, and these pattern ribs are adapted to project through suitable openings provided upon the flask or mold walls 28. These mold walls 28 are adapted to serve as stripping plates in a manner hereinafter described, and are also adapted to contact and lock the hinged sides 13 and 33 of the device. The mold walls 28 are provided with outwardly extending brackets 29 positioned adjacent the ears 26 of the pattern plates 27'. The brackets 29 are provided with a channel 30 adapted for the reception of a pintle 31 by which the link 25 is secured upon the ear 26 of the pattern plate 27'. The channel 30 is provided with perforations, which are designed for the reception of a threaded element secured upon a stop block 31', and by which the opening or length of the channel 30 may be regulated. The stop blocks 31' are adapted to be contacted by the pintle 31 of the links 25 so that the pattern plate 27' carrying the pattern ribs 27 will be moved away from the mold walls a predetermined distance before the said mold walls and pattern plates 32 connected therewith, are moved away from the mold. The flask or mold walls 28 are provided with suitable mold or pattern plates 32. The mold plates 32 and the mold walls 28 are rigidly secured together, and the mold plate 17 and the mold bottom 12 are likewise rigidly secured together. The plates 17 and 32 may be of any preferred design for forming suitable impressions upon the mold.

By the arrangement of the devices above described, it will be noted that when fluid is admitted to the cylinder 2 above the piston 6, the piston is forced downwardly carrying with it the collar 18, swinging the L-shaped levers 20 upon their pivots which in turn swings the arms 23 connected with the plates 27' forcing the ribs 27 outwardly through the opening provided by the flask or mold walls 28. As the pattern plate 27' is slid away from the mold the pintle 31 within the channel 30 of the member 29 contacts the stop 31', and as further pressure is exerted upon the member 23 the mold walls 28 and the mold strips 32 will move away from the mold in unison with the pattern plates 27'. It will be noted by this operation that as the ribs 27 are moved through the openings provided by the mold walls, the ribs are effectively stripped. It will be noted by referring to the left hand side of Fig. 1 of the drawings, that the mold wall and pattern rib are arranged at an angle. This is desirable in some instances and by arranging the link 22 with the openings 22' it will be readily seen that upon securing the pintle of the arm 23 in any of the series of openings 22', the sides of the mold may be readily adjusted at any desired angle. It will be also noted that as the sides of the machine are moved away from out of engagement with the core, the table 14 descends with the piston 6, and carries with it the pattern ribs 16.

The front walls 33 of the machine may be provided with suitable patterns or portions of patterns, but as illustrated in Fig. 3, the plate has a smooth inner face and is provided with a projecting link or finger 34 pivoted to a lug 35 provided by the portion 7 of the device. The link or hinge 34 is provided with a pivoted member 36 having its free end pivotally connected with the drop table 14. By this arrangement it will be seen that when the table is moved the member 36 will force the hinged member 34 to swing upon its pivotal connection with the projection 35, thus opening or closing the wall 33 upon the sections of the mold.

It is the purpose of the present invention to dispense with cores in the construction of molds, and it is a further purpose to provide means whereby the molds formed from green sand may be readily supported while in the flask and in being removed from the flask. In order to accomplish this I have provided an arbor 37, comprising a pair of spaced longitudinal bars intersected by a pair of spaced transverse bars. To the under faces of these bars are secured a plurality of sand retaining keys 38. The keys 38, as well as the arbor 37 may be of any preferred construction and design, and the keys are arranged upon the arbor in a manner best suited for supporting a mold. The arbor 37 is supported upon the frame of the mold by suitable arms 37′ integrally formed upon the brackets 24, or otherwise secured to the frame in any desired manner.

By reference to Figs. 3 and 6 of the drawings it will be observed that the mold formed by this machine presents substantially one half of two complete molds, being the end of both molds and one half the body of each mold, the idea being that each successive unit or mold when placed in a suitable trough adjacent the preceding unit completes a mold and leaves one half of a mold which is completed by the next successive unit and so on until the trough in which the units are placed is entirely filled.

When the mold is completed, it is removed from the machine by means of the arbor 37, and a separate arbor positioned upon the device and green sand applied for the formation of a second mold in the well known manner.

When the mold is of such a nature as to require being turned upside down, especial means must be employed. The completed mold cannot be successfully rolled over on a receiving table without connecting the arbor with the bottom mold plate 12, and in order to provide for this I have the transverse arms of the arbor provided with annular depressions, adapted for the reception of a securing element 38′, adapted to connect the arbor with the plate 12. The depressions within the arbor are provided with rectangular grooves or cut away portions, and the head of the securing element 38′ is also provided with a rectangular head 39, adapted for engagement with the cut away portion of the slotted arbor. The lower extremity of the securing element 38′ is reduced and threaded, and this reduced portion is adapted for reception within suitable openings provided within the plate 12, and secured thereto by a suitable locking element 40. By this arrangement it will be seen that the plate 12 may be swung rearwardly upon its pivot and the core securely retained in position. A suitable table or other support, not shown, is positioned adjacent the rear of the machine adapted for the reception of the arbor and swinging portion of the machine supporting the core. When the arbor is deposited upon the table or support, the retaining elements 38′ are given a quarter turn to bring the head 39 in alinement with the rectangular slot of the arbor, releasing the plate 12 and the frame swung back to position upon the support 9.

While I have described and illustrated my machine as being operated by a motive fluid contacting a reciprocating piston, it is to be understood that I do not limit myself to this mode of operation, as means mechanically operated, such as a lever connected with the rod 5 will prove equally effective in the operation of the device. It is to be further understood that I do not limit myself to the operation of the mold walls simultaneously, as circumstances may present themselves in which it would be advantageous to operate the doors and pattern strips at different intervals.

In Fig. 5 I have illustrated a slightly modified form of the invention. In this figure the mold walls 41 are arranged at an angle to each other and the arbor 42 is provided with substantially V-shaped projections adapted to support the green sand. The arbors 42 are provided with extending horizontal fingers 43 adapted to be positioned upon the frame 44 of the device. The rear end or wall 45 is pivotally connected as shown and the walls may be operated by any desired power.

In Fig. 6 I have shown a trough adapted for the reception of the molds or mold units constructed by my machine. This trough 46 is of an approximately cross sectional contour corresponding with the mold, and may be of any desired length. As clearly shown in this figure the molds 47 are adapted to be positioned adjacent each other to form a complete mold, and that each of the units formed by the machine presents substantially one half of two complete molds and that a complete mold is formed when the next unit is positioned in the trough adjacent the unit already within the trough.

While my machine entirely dispenses with cores, it will be noted that it may be efficiently employed for the formation of cores.

Having thus fully described the invention what is claimed as new is:

1. A molding machine having movable mold forming walls slidably connected with the frame of the machine, means for adjusting the walls in angular relation to the machine, arms pivotally connected with the sliding walls and with the machine, and means for rocking the arms to slide the walls in different directions from the mold.

2. In a molding machine, the combination with mold forming walls or flask sections having patterns or parts of patterns attached thereto and means for drawing the patterns from the mold simultaneously with the mold forming walls or flask sections.

3. In a molding machine, the combination of pattern plates having pattern ribs, mold walls provided with openings adapted for the reception of pattern ribs, a movable table supporting the pattern ribs, and means for withdrawing all of the pattern ribs simultaneously from the mold.

4. In a molding machine having movable mold walls and pattern ribs and means for operating the walls and ribs, of a mold holding arbor supported upon the frame of the machine and provided with keys adapted to support the green sand of the mold.

5. In a molding machine having movable mold walls and pattern ribs and means for operating the walls and the ribs, of a mold holding arbor supported upon the frame of the machine and provided with keys adapted to support the mold, and said arbor being provided with retaining elements by which it is detachably secured to the bottom mold plate of the machine.

6. The combination of mold forming walls or flask sections, said flask sections being provided with openings for the reception of the pattern parts, and means for drawing the pattern parts through the flask sections.

7. In a molding machine, the combination of pattern plates having pattern ribs, mold walls provided with openings adapted for the reception of the pattern ribs, a movable table supporting the vertical pattern ribs, a piston upon the table, a collar upon the piston, levers connected to the collar for operating the remaining ribs, and means for reciprocating the piston.

8. In a molding machine, a base, a frame upon the base, a mold board having a vertical end upon the frame and hingedly secured thereto, sectional mold plates upon the mold board and wall or extension of the mold board, vertically extending pattern ribs projecting through the mold board, a table below the mold board and supporting the pattern ribs, a yoke for the table, a plunger rod upon the yoke, a collar upon the plunger rod, L-shaped levers pivotally mounted to the frame connected with the collars, a link having a series of perforations connected with the lever, brackets upon the frame, an arm slidably mounted in the brackets, mold walls having mold plates connected with the arm, the arm being provided with a longitudinally extending slot having a plurality of perforations, a stop within the slot having a retaining element adapted to engage one of the perforations, the mold wall being provided with openings, a pattern rib connected with a pattern plate within the openings of the mold wall, an extension upon the pattern plate, a link pivotally connected with the extension, a projection upon the extension engaging the channel of the arm, an arm pivotally connected with the bracket and engaging the link and the perforated link connected with the L-shaped arm, a door upon the front of the machine, a hinge for the door, a link connection between the hinge and the table, a plunger for the plunger rod, and means for operating the plunger.

In testimony whereof I affix my signature in presence of two witnesses.

GEORGE WILLIAM SOUTHWICK.

Witnesses:
JOHN GUY PARK,
ARTHUR CLARENCE WENZEL.

---

Copies of this patent may be obtained for five cents each, by addressing the "Commissioner of Patents. Washington, D. C."